United States Patent [19]

Dorn et al.

[11] 3,933,991

[45] Jan. 20, 1976

[54] SULFURIC ACID CONTACT PROCESS

[75] Inventors: Ludwig Dorn, Cologne; Gerhard Heinze, Schildgen; Jürgen Wokulat, Leverkusen; Wilhelm Möller, Leverkusen; Franz Rübsam, Leverkusen, all of Germany

[73] Assignee: Bayer Aktiengesellschaft, Leverkusen, Germany

[22] Filed: Aug. 3, 1973

[21] Appl. No.: 385,378

Related U.S. Application Data

[60] Division of Ser. No. 229,163, Feb. 24, 1972, Pat. No. 3,793,230, which is a continuation of Ser. No. 36,234, May 11, 1970, abandoned.

[30] Foreign Application Priority Data

May 23, 1969 Germany ............................ 1926564

[52] U.S. Cl. .................................. 423/535; 423/522

[51] Int. Cl.[2] ........................................... C01B 17/78

[58] Field of Search ............ 423/534, 535, 538, 522

[56] References Cited

UNITED STATES PATENTS

| | | | |
|---|---|---|---|
| 1,371,004 | 3/1921 | Slama | 423/535 |
| 2,449,190 | 9/1948 | Belchetz | 423/538 |
| 2,799,560 | 7/1957 | Davies | 423/535 |
| 3,216,953 | 11/1965 | Krempff | 423/535 |
| 3,275,406 | 9/1966 | Krempff | 423/535 |

FOREIGN PATENTS OR APPLICATIONS

| | | | |
|---|---|---|---|
| 898,985 | 6/1962 | United Kingdom | 423/535 |

*Primary Examiner*—Oscar R. Vertiz
*Assistant Examiner*—Gary P. Straub
*Attorney, Agent, or Firm*—Burgess, Dinklage & Sprung

[57] ABSTRACT

A catalyst for oxidation of $SO_2$ to $SO_3$, which can be used as a fluidized bed catalyst. An abrasive resistant support is formed by adding silica filler and a clay binder to a silica sol; adding hydrated magnesium oxide to the resulting mixture, to form a gellable composition; dispersing the gellable composition in a liquid to form gel spheres; calcining the spheres; and treating them with an acid to remove acid soluble components. After the acid treatment, the support is impregnated with an alkali metal vanadate solution and calcined.

3 Claims, No Drawings

SULFURIC ACID CONTACT PROCESS

This is a division, of application Ser. No. 229,163 filed Feb. 24, 1972, now U.S. Pat. No. 3,793,230, which in turn is a continuation of Ser. No. 36234 of May 11, 1970, now abandoned.

This invention relates to a process for the production of a catalyst especially suitable for the oxidation of sulfur dioxide into sulfur trioxide. While suitable for use in fixed beds, a special feature of the invention is usefulness in fluidised beds.

A catalyst suitable for use in a fluidised bed has to have a number of properties. The active surface area per unit volume should be as large as possible. The pore structure should be such as to allow a rapid diffusion of gas from the surface of the catalyst grain to the active centers inside. The catalyst should contain little or no substances which initiate or promote secondary reactions. It should consist of spherical particles, with the particle diameter and particle size distribution adapted to the particular process and the technical requirements prevailing, and should show extremely high mechanical strengths including, in particular, a high resistance to abrasion.

The requirements concerning a large active inner surface, favorable diffusion paths and a high mechanical strength can only be brought into line with one another by compromise solutions because on the one hand an extremely high mechanical strength can only be obtained with a relatively low porosity. On the other hand, relatively large inner surfaces in the catalyst grain are only obtained, for a given pore volume, with a very large number of and hence narrow pores which are unfavorable for gas diffusion.

On account of the high mechanical stressing to which the catalyst grain is subjected in the fluidised bed, it is inadvisable to sacrifice mechanical strength of the granulate in favor of porosity. Accordingly, the pore volume should not be too high. Another consideration is that the generally shorter residence times of the reagents in fluidised beds as opposed to fixed beds necessitate correspondingly high diffusion rates governed by the grain size of the catalyst and hence adequate pore diameters. In the case of volume porosity determined by the required strength of the catalyst grain, these requirements can only be satisfied by catalysts of the kind which have a low fine-pore component and hence a low specific surface. Therefore, depending on the operating conditions in the fluidised bed, a fluidised-bed catalyst should have as large as possible a useful, catalytically active surface in addition to extreme hardness.

In the conventional sulfuric acid contact process in a fixed bed, the $SO_2$ is generally oxidized on cylindrical catalyst mouldings containing vanadate. In general, these are obtained by mixing vanadium pentoxide or ammonium meta-vanadate with a strong alkali liquor and a finely divided supporting material consisting primarily of silica such as kieselguhr or silica gel, or asbestos, followed by mechanical forming or moulding in an extruder. The catalytically active substance is the alkali vanadate formed, whilst the silica-based materials form the porous supporting substance. Potassium is preferred to sodium as the alkali metal in all vanadate catalysts for the oxidation of $SO_2$. Traces of other metal oxides as promoters are intended to produce an increase in activity. Highly active vanadate catalysts are known to contain an excess of alkali exceeding the quantity required to form the meta-vanadate; a molar ratio of alkali metal oxide ($Me_2O$) to vanadium pentoxide ($V_2O_5$) of 2:1 or higher being preferred.

It is also known that catalysts for the oxidation of sulfur dioxide into sulfur trioxide can be prepared by initially moulding the silica-based supporting material by extrusion and then impregnating it with the catalytically active substance. Potassium vanadate is preferred in this case, too. According to German Auslegeschrift 1,281,407, the alkali metal component, which exceeds the molar ratio of $Me_2O$:$V_2O_5$ of 1:1, is replaced by the corresponding alkali metal sulfate so as to prevent the mouldings from bursting when impregnated with the solution containing the active substances.

The catalysts prepared from kieselguhr, potassium vanadate and optionally potassium sulfate by the methods described have a relatively low specific surface of around 10 $m^2/g$ according to BET (Brunauer, Emmet and Teller) for a relatively high pore volume of approximately 500 to 600 $mm^3/g$. Most of the pores have a diameter in excess of 100 A, the average pore diameter generally being between 2000 and 5000 A-units. Average pore diameters of as much as 12000 A-units have already been found in catalysts of this kind. On the other hand, conventional vanadate catalysts do not contain any micropores with dimeters of 100 A-units or less, which are attributable to silicate formation accompanied by sealing of these micropores from the effect of the alkali.

The catalysts described in the foregoing passages give respectable yields in the commercial production of $SO_3$. Their disadvantages arise out of their inadequate hardness and the shape and size of the grain which do not allow any further increase in the effectiveness of the catalyst. In the same catalyst material, such an increase would be possible by reducing the size of the grain. However, reaction in fluidised beds is the only alternative on account of the excessively high flow resistances in fixed beds in the case of catalyst grains less than about 3 mm in diameter. Although it would seem possible to produce spherical granulates with a diameter of less than 3 mm from the catalyst compositions described above, their limited hardness would prevent them from being used in fluidised beds.

Hard, abrasion-resistant, spherical, catalyst supports can be obtained in the conventional manner by mixing alkali metal silicate with sulfuric acid an/or an aluminium sulfate solution to form an unstable sol and then allowing the gelling solution to flow into an organic medium. After drying and calcining, a granulate of a shrunken gel is obtained which does not lend itself to impregnation with aqueous solutions of catalytically active substances on account of its very narrow pores. Subsequently this granulate does not allow rapid gas diffusion when in service.

The use of abrasion-resistant, bead-form catalysts for a fluidised bed process for the production of sulfur trioxide has been proposed, consisting of aluminium silicate containing vanadium. An $Fe_2O_3$ fluidised-bed catalyst obtained by calcining mouldings of roasted pyrites, water glass and glycerol, has also been used for the oxidation of $SO_2$. Unfortunately, however, the conversion obtained was far lower than that obtained with the conventional vanadate catalysts.

By virtue of their pore structure, bead granulates suitable for use as catalysts or as catalyst supports can be obtained by conventional processes comprising suspending finely-divided inorganic solids in a stable silica sol, mixing the resulting suspension with a gelling agent, dispersing the gellable mixture into droplets and solidifying these droplets into spherical granulates in an organic medium. The bead granulates thus prepared have specific surfaces of less than 300 $m^2/g$ according to BET, average pore diameters of around 100 A or more and can readily be impregnated with solutions of catalytically active substances. However, their mechanical properties generally do not meet the stringent requirements which are required for a fluidised-bed catalyst.

THE INVENTION

A process for the production of a bed-form, abrasion-resistant, highly active, supported catalyst for the oxidation of sulfur dioxide into sulfur trioxide by suspending solids in an aqueous stable silica sol with a specific surface according to BET of from 150 to 400 $m^2/g$, mixing the resulting suspension with an aqueous suspension of hydrated magnesium oxide in quantities of from 0.1 to 3% by weight of MgO (on basis of anhydrous MgO), based on the anhydrous granulate, dispersing this gellable mixture in a liquid immiscible with water to form drops of the required size, separating the solidified gel spheres from the liquid, drying, calcining and impregnating the supporting materials with an alkali metal vanadate solution, has now been found in which a silica-containing filler containing from about 5 to 10% by weight of CaO, with a specific surface according to the BET of from 40 to 80 $m^2/g$, and a clay binder, preferably kaolin, are suspended in the silica sol in quantities such that the calcined granulate contains from 20 to 60% by weight filler and from 15 to 25% by weight clay or kaolin, the bead granulates obtained from the resulting suspension by gelling as known per se are dried, hardened for at least 10 minutes at a temperature of in excess of about 500°C, preferably from 500° to 1000°C, treated with acid, washed, impregnated with the vandate solution, redried and heated for at least 10 minutes at in excess of about 400°C, preferably 400° to 500°C. Normally the calcined granulate contains $SiO_2$ from the silica sol in an amount of from 25 to 75% by weight.

The term kaolin and clay as used herein shall comprise the pure mineral kaolinite, the chief constituent of kaolin and certain clays as well as substances containing more or less amounts of kaolinite together with other clay forming components such as montmorillonite, attapulgite, bentonites, green earth and the like. Kaolin as used in its broad sense covers fire clays, china clays, porcellan clay, bolus alba and the like.

By virtue of the process according to the invention, it is possible to produce bead-form, abrasion-resistant and highly active supported catalysts for the oxidation of sulfur dioxide into sulfur trioxide which, by virtue of their hardness, their chemical composition and their pore structure, are also eminently suitable for use in fluidised beds.

To produce the supported catalysts by the process according to the invention, the solids are suspended in an aqueous stable silica sol with a specific surface of from 150 to 400 $m^2/g$ according to BET, the resulting suspension is mixed with an aqueous suspension of hydrated magnesium oxide in a quantity of from 0.1 to 3% by weight of MgO, based on the anhydrous granulate, the resulting gellable mixture is dispersed in a liquid immiscible with water to form drops of the rquired size, the solidified gel spheres are separated from the liquid, dried, hardened by calcining for at least ten minutes at a temperature above about 500°C. e.g. from 500° to 1000°C, acidified, washed, impregnated with vanadate solution, redried and heated (calcined) for 10 minutes at a temperature of at least about 400, e.g. at between 400° and 500°C.

In the context of the invention, a silica filler is a large-surface, amorphous silica obtained from an alkali metal silicate solution by gradual precipitation with a mineral acid and an aqueous solution of a calcium salt. However, the quantity of calcium salt is always such that silica is the predominating constituent of the filler. Silica filters with a specific surface according to the BET of from 40 to 80 $m^2/g$ are suitable for the process according to the invention. The quantity in which the filler is used is such that the anhydrous or calcined granulate, which is an intermediate product, contains from 20 to 60% by weight and preferably from 35 to 50% by weight thereof. The filler is intended to contain from about 5 to 10% by weight of CaO.

Filler-like natural products, such as kieselguhr or asbestos for example, with a specific surface or usually less than 20 $m^2/g$ do not give adequate compressive strength or abrasion resistance. Dried and ground silica gels instead of the fillers are just as unsuitable for the process according to the invention. Gels of this kind with specific surfaces of from 200 to 800 $m^2/g$ give a granulate that is excessively fine-pored.

In addition to silica fillers, clay minerals from the group comprising kaolin, kaolinite, montmorillonite and attapulgite, preferably kaolin, may also be added in the process according to the invention. These ceramic binders impart high green strnegth to the still moist granulates and thus make for better handling. The presence of clay minerals, kaolin in particular, in the completed calcined supporting granulates provides for outstanding mechanical strength which surprisingly remains substantially intact even when the aluminium is subsequently dissolved out with acid, providing the material is subjected to further calcination after the acid treatment. This additional calcination stage may follow immediately after acid extraction, although it is carried out with greater advantage after the supporting materials have been impregnated with vanadate solution.

Following separation from the organic liquid, the bead granulates obtained in the conventional manner from the suspension of silica fillers and clay minerals in aqueous silica sol are dried and hardened in an initial calcination stage for at least 10 minutes at a temperature of in excess of about 500°C, preferably at 500° to 1000°C. This calcinatioh stage has proved to be necessary because otherwise the granulates are not sufficiently resistant for the following acid extraction stage.

This calcination stage is followed by extraction with an acid. Dilute mineral acids, for example dilute sulfuric acid or dilute hydrochloric acid, may be used for the extraction. The quantity of acid to be used is governed by the quantity of the acid-soluble constituent, such as for example $Al_2O_3$, CaO and MgO. It is best to use a quantity which is in a 50% stoichiometric excess. Extraction may also be carried out in two stages by using partly spent acid for pre-leaching a fresh batch of the granulate, in order more effectively to utilise the acid. Extraction can be accelerated by operating at an elevated temperature, for example, from 40° to 80° C., and by continuously recirculating the acid through the layer of granulate by means of a pump. Acid treatment is continued until most of the acid-soluble cations have been removed.

It has been found that extraction of the supporting granulates with acid leads to an increase in the catalytic activity of the catalysts prepared from the granulates by impregnation with a vanadate solution. This increase in catalytic activity, compared with non-acid-extracted but otherwise identical samples, is reflected in quasi-isothermal testing in a fixed bed, especially at a temperature in a range from 400° to 450° C., which is of considerable significance in the commercial production of sulfuric acid. See Example 4, infra.

In all probability, the effect of acid extraction is primarily associated with the aluminium content of the supporting materials which is considerably reduced by extraction. On completion of acid extraction, the supports consist predominantly of amorphous silica and preferably have an $SiO_2$-content of at least 97%. By contrast, the limited increase in the porosity of the supporting materials which have not yet been impregnated with vanadate which is also observed as a consequence of acid extraction will not have any effect upon the activity of the catalysts prepared from them. This is because as a rule specific surface and porosity are reduced by impregnation with an alkali metal vanadate to such an extent that there is no appreciable difference between acid-extracted and untreated preparations in regard to specific surface and porosity in vanadate-impregnated catalysts. In addition, an increase in porosity would, in principle, by no means bring about an increase in catalytic activity. If for example highly porous catalyst supports with pore volumes of 1,000 $mm^3/g$ or more are impregnated in the same way with vanadate solutions, the catalysts thus prepared do not show any increase in their catalytic activity although their hardness is considerably reduced.

After the acid-extraction stage, the supporting materials are freed from excess acid and the salt solution formed by washing. This in turn is followed by impregnation with vanadate. According to the invention, impregnation is carried out with a potassium vanadate solution containing $K_2O$ and $V_2O_5$ in a molar ratio of from 1.5:1 to 3.0:1. The concentration of the solution is best selected so that the supporting catalyst present following impregnation contains from 4 to 8% by weight of $V_2O_5$, based on the impregnated anhydrous granulate, after only one impregnation. Below a $V_2O_5$-content of around 4%, there is a fall in catalytic activity, whilst contents greater than approximately 8% by weight do not bring about any further improvements and are not advisable for economic reasons. Impregnation with potassium vanadate solution can be carried out without heat, although the potassium vanadate solution may also be heated in order to accelerate the operation. After a few hours, the support has usually absorbed all the vanadium it can. On completion of impregnation, the granulates are filtered off from the excess vanadate solution, dried without being previously washed and calcined for at least 10 minutes at 400° to 500° C.

The $K_2O$ content of the catalyst employed pursuant to the present invention is generally from 3.1 to 12.4 weight percent $K_2O$, based upon the weight of the impregnated anhydrous catalyst.

As usual in the case of sulfuric acid catalysts, the catalysts are initially carefully sulfated with gases containing a little $SO_2$ before actually being used for the oxidation of the roaster gas, in order to prevent an over-moderate increase in temperature caused by the heat of neutralisation of the free alkali with the acid constituents of the gas. To this end, the catalyst bed is normally heated with hot air to a temperature of from 400° to 500° C. and then increasing quantities of $SO_2$ added to the air stream in stages.

The outstanding properties of the supported catalysts produced by the process according to the invention are attributable partly to their material composition and partly to their unique pore structure.

The total pore volume can be expressed in $mm^3/g$, or in percent, i.e. as a component of the pore volume of the volume of the grains, in percent (so-called volume porosity). The total pore volume $V_t$ is calculated in accordance with the following equation from the apparent density $\rho_s$ and the true density $\rho_w$ which in turn are determined pyknometrically with mercury or helium as the medium:

$$V_t \text{ mm}^3/\text{g} = \left\{ \frac{1}{\rho s} - \frac{1}{\rho w} \right\} \cdot 1000$$

The mercury porosimeter method in the measuring range from about 150 to 10,000 A is used to determine the pore volumes in dependence upon the pore diameter. Pore volumes of pore diameters of less than about 150 A are determined by the nitrogen desorption method.

It has been found that the supporting materials prepared as intermediate products contain a large number of pores with diameters of from 100 to 1000 A-units, in addition to relatively small pores. It has also been found that in the impregnation according to the invention with a strongly alkaline vanadate solution it is substantially the proportion of pores with diameters of less than 100 A that is reduced. Therefore, in the vanadate-impregnated, supporting catalysts according to the invention a proportion of at least 80% of the total pore volume present is in the range of from 100 to 1500 A. The disappearance of the fine pores is attributable to a chemical action of the alkali upon the skeleton substance, so that the fine pores are rendered inaccessible.

In the new supported catalysts which are prepared in accordance with the preferred preparation conditions of the process according to the invention, the total pore volumes are in the range of from 300 to 450 $mm^3/g$. Although this value is lower than in conventional sulfuric acid catalysts based on kieselguhr, it provides for the same conversions together with significantly improved mechanical properties. Since the specific surfaces of the new catalysts are of the same order (10 to 40 $m^2/g$ according to BET) as those of the conventional keiselguhr-based catalysts, it must be assumed from the lower total pore volume that of the kieselguhr catalysts it is not a smaller number of pores, but pores with a lower average diameter that are present. In actual fact, the average pore diameters in keiselguhr catalysts have been found experimentally to be in the range above 1000 A. The relatively low values for the total pore volume and the average pore diameters are responsible for the extraordinary mechanical strength of the novel catalysts according to the invention which makes them suitable for use in fluidised beds.

The mechanical property which is of the greatest significance to use in fluidised beds is abrasion resistance. It is determined by a flow method in which the granulate in a grain fraction of from 0.4 to 2 mm is blown by an air stream issuing from a nozzle against a baffle zone in a continuous cycle. The apparatus as illustrated by the accompanying figure consists of a vertically arranged, outer glass pipe 1 with an internal diameter of 50 mm and a concentric inner tube 2 with an internal diameter of 6 mm and a length of 280 mm. A 2 mm wide, 140 mm long capillary 3 acting as nozzle is inserted into the lower end of the outer glass pipe opposite to tube 2. A baffle plate 4 covered with a cone is arranged 30 mm above the opening of the 6 mm wide pipe. To determine abrasion, 100 ml of the sample are separated from the fine component through a test sieve according to DIN 4188, mesh width 400 $\mu$m, weighed and introduced into the apparatus and placed around the nozzle. An air stream of $3Nm^3/h$ is passed through the nozzle. The granulate 5 drawn into the concentric tube 2 by the injector effect is thrown against the baffle plate, after which it drops back to the nozzle through the outer annular space. After one hour, the air stream is cut off, the granulate freed from the fine component on the same test sieve and then weighed back. The percentage weight loss is expressed as the abrasion. According to this method, the catalysts obtained in the preferred conditions of the new process have abrasion losses of less than 3%.

EXAMPLE 1 a. 2800 g of a silica filler precipitated from soda water glass with calcium chloride and aqueous hydrochloric acid, and 1200 g of kaolin were suspended by means of an intensive mixer in 10 liters of an aqueous silica sol (density 1.29 g/ml, 30% by weight of $SiO_2$) with a specific BET surface of 200 $m^2/g$. The silica filler had a specific BET surface of 50 $m^2/g$ and an average particle diameter of 7.5 $\mu$ determined by weighing. It consisted of 75% of $SiO_2$, 8% of calcium oxide and 17% of free and combined water. The kaolin had an average particle diameter determined by weighting of 6.3 $\mu$. It consisted of 47% of $SiO_2$, 38% of $Al_2O_3$ and 15% of water and traces of other oxides. Accordingly, the suspension had a calculated composition, based on solids, of:

approximately 47% by weight of $SiO_2$ from the silica sol;
approximately 37% by weight of silica filler, and
approximately 16% by weight of kaolin;

or according to the chemical composition, based on the solids:

approximately 90% by weight of $SiO_2$;
approximately 7% by weight of $Al_2O_3$;
approximately 3% by weight of CaO.

10 Litres per hour of the aforementioned suspension and 1.2 litres per hour of an aqueous magnesium oxide suspension containing 80 g of MgO/litre were continuously delivered by metering pumps to a mixing vessel from which the gellable mixture of the two suspensions ran on to a rotating distributor. The gellable mixture was separated by the distributor into thin streams. Beneath the distributor there was a column filled with o-dichlorobenzene. On entering the organic medium, the streams of the suspension were broken up into spherical droplets which as they sunk solidified as a result of gelling.

The granulate, still formable, was separated off from the o-dichlorobenzene, dried in an air stream and then calcined be heating for 2 hours to 700°C. A bead-form extremely hard material with grain diameters of from 0.4 to 2 mm was obtained. It had a specific BET surface of 124 $m^2/g$, a pore volume of 501 $mm^3/g$, an abrasion loss of 1% by weight as determined by the dynamic testing method described supra.

b) The bead granulate thus obtained was treated for 15 hours with a 50% excess, based on the $Al_2O_3$ + CaO-content, of 20% aqueous hydrochloric acid heated to 70°C, washed free of the acid and dried at 110°C to provide a dried, acid treated granulate. A sample of the resulting supporting material, which was calcined for 1 hour at 700°C, had a specific surface of 133 $m^2/g$, a pore volume of 575 $mm^3/g$ and an abrasion loss as determined by the dynamic method of 1.5%. Chemical analysis showed the following:

1.5% loss through calcination at 1,150°C;
1.1% of $Al_2O_3$; and
97.4% of $SiO_2$.

c. 5 kg of the supporting granulate, i.e. the dried acid treated granulate, prepared as described in a) and b) were introduced into 8 litres of a potassium vanadate solution, heated to 60°C, containing 1.5 mol of $K_2O$/-liter and 0.75 mol of $V_2O_5$/liter. After 5 hours, no more air bubbles were seen to escape. After filtering, the impregnated granulate was dried in an air stream and then calcined for 2 hours at 500°C. The $V_2O_5$ content amounted to 4.8% by weight, the specific surface to 24 $m^2/g$, the pore volume to 402 $mm^3/g$ and the abrasion loss to 0.6%.

EXAMPLE 2

A catalyst prepared in accordance with Example 1 a), b) and c) and sulfated with gases containing a little $SO_2$ was tested under adiabatic conditions in a semi-commercial, fluidised bed apparatus to determine its activity during the catalytic oxidation of $SO_2$ to $SO_3$.

The contact furnace was in the form of a certically arranged, cylindrical container with an internal diameter of 310 mm and a height of 1,000 mm. At its lower end, it was closed with a gas-permeable, asbestos cloth on a screen plate, whilst at its upper end it widened into a container provided with baffles which had an internal diameter of 500 mm. 26 kg of supporting catalyst were introduced into the lower vessel. Following dust filters were used to retain the dust accumulating through abrasion of the catalyst. The contact furnace was preceded by a preheater for heating the gaseous reaction mixture to the required inlet temperature of the contact furnace. All parts of the apparatus and pipes were heat insulated. The temperature of the reaction gas was measured before entry ($t_1$) into the fluidisation furnace and in the fluidised bed ($t_2$).

The catalyst material was fluidised at a throughput of 40 $Nm^3$ of gas per hour corresponding to a gas flow rate of around 0.15 m/second, based on an empty converter and normal conditions. The following Table 1 shows conversion figures and the temperatures $t_2$ that settled in dependence upon the entry temperature $t_1$ and upon the $SO_2$ and oxygen content of the input gaseous mixture.

TABLE 1

| Throughput Nm³/h | Inlet temperature $t_1$ | Bed temperature $t_2$ | Composition of roaster gas % $SO_2$ | % $O_2$ | % Conversion of $SO_2$ into $SO_3$ |
|---|---|---|---|---|---|
| 40 | 246 | 498 | 11.1 | — | 89.0 |
| 40 | 290 | 488 | 7.3 | 10.4 | 89.2 |
| 40 | 248 | 494 | 11.3 | 11.8 | 88.0 |
| 44 | 218 | 513 | 12.8 | 11.8 | 87.0 |
| 40 | 216 | 532 | 14.0 | 10.0 | 80.0 |
| 65 | 290 | 500 | 10.7 | 9.7 | 72.4 |

After three months' operation, the abrasion loss amounted to less than 1% by weight.

EXAMPLE 3

100 ml of the catalyst prepared in accordance with Example 1 a), b) and c) were tested in a fixed bed in a laboratory apparatus under quasi-isothermal conditions to determine its activity in the sulfuric acid contact process. 90 Nl/hour of a gaseous mixture of $SO_2$ and air, containing 7.9% by volume of $SO_2$ were passed over the catalyst at an inlet temperature of 410°C. The temperature in the middle of the contact or catalyst bed rose to 418°C and at the end of the contact tube fell to 412°C. The conversion of $SO_2$ into $SO_3$ amounted to 98.5%.

EXAMPLE 4 (No acid treatment)

A supported catalyst with a $V_2O_5$-content of 4.6% by weight, a specific surface of 18 m²/g, a pore volume of 342 mm³/g and an abrasion loss of 0.8% by weight was obtained by impregnating a catalyst support containing approximately 7% of $Al_2O_3$, prepared in accordance with Example 1 a), with a potassium vanadate solution with the composition indicated in Example 1c). 100 ml of this catalyst were tested as described in Example 3 to determine its activity in the sulfuric acid contact process. At an inlet temperature of 415°C, the conversion of $SO_2$ into $SO_3$ amounted to 97.5%.

The "anhydrous granulate" is the product of calcining the dried granulate obtained by drying the product of the gelling step, and is at times referred to as calcined granulate.

What is claimed is:

1. In a process of producing sulfur trioxide by contacting sulfur dioxide, oxygen and a catalyst at an elevated temperature in a fluidized bed process the improvement which comprises utilizing as the catalyst, a silica gel bonded bead form catalyst comprising a siliceous support having at least 97% by weight silica and a finite amount up to 8% by weight of $V_2O_5$ and 3.1 to 12.4% by weight of $K_2O$, based on the weight of the catalyst, said catalyst having a proportion of pores with diameters from about 100 to 1500 A of at least 80% of the total pore volume present, said catalyst having an abrasion resistance of from about 0 to 3% by weight.

2. A process according to claim 1 wherein $V_2O_5$ is present in an amount from 4 to 8% by weight based upon the weight of the catalyst.

3. A process according to claim 1 wherein said catalyst has a pore volume of 300 to 450 mm³/g.

* * * * *

UNITED STATES PATENT AND TRADEMARK OFFICE
CERTIFICATE OF CORRECTION

PATENT NO. : 3,933,991

DATED : January 20, 1976

INVENTOR(S) : Ludwig Dorn et al

It is certified that error appears in the above-identified patent and that said Letters Patent are hereby corrected as shown below:

Column 4, line 34, "strnegth" should read -- strength --.

Column 4, line 53, "calcinatioh" should read -- calcination --.

Column 6, line 17, "$p_s$" should read -- $\rho_s$ --.

Column 6, line 17, "$p_w$" should read -- $\rho_w$ --.

Column 6, lines 21-23 (in the equation) "$p_s$" should read -- $\rho_s$ --
"$p_w$" should read -- $\rho_w$ --.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*